April 20, 1926.
F. R. NEAL
CREEPER
Filed June 16, 1925
1,581,592
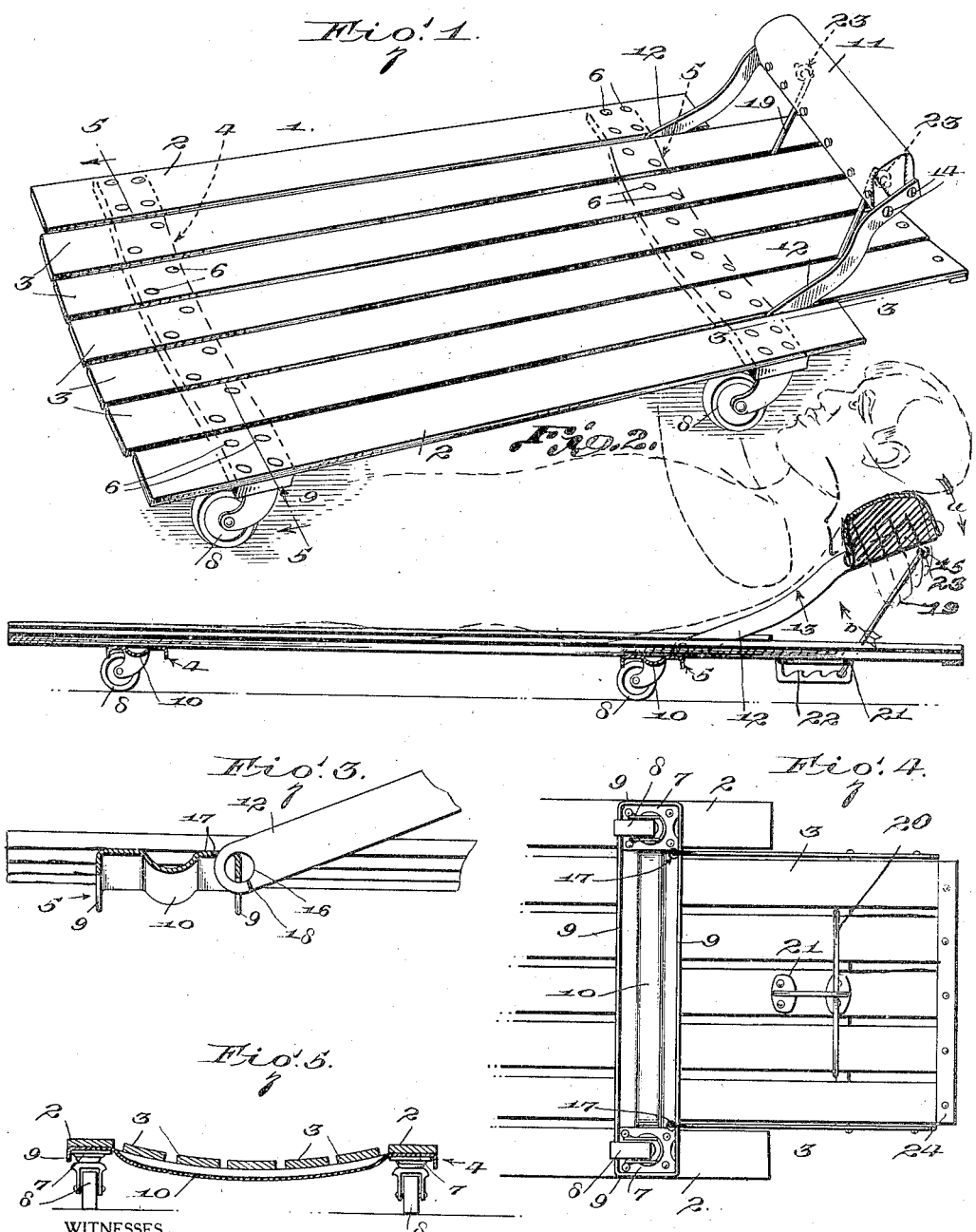
WITNESSES
INVENTOR
ATTORNEYS Patented Apr. 20, 1926.

1,581,592

UNITED STATES PATENT OFFICE.

FRANK RAY NEAL, OF WOODFORDS, MAINE.

CREEPER.

Application filed June 16, 1925. Serial No. 37,562.

*To all whom it may concern:*

Be it known that I, FRANK RAY NEAL, a citizen of the United States, and a resident of Woodfords, in the county of Cumberland and State of Maine, have invented certain new and useful Improvements in Creepers, of which the following is a specification.

This invention relates to improvements in creepers, and it consists of the constructions, combinations and arrangements herein described and claimed.

An object of the invention is to provide a low car, commonly known as a creeper, for the purpose of enabling a mechanic to more readily move about beneath a motor vehicle, one of the advantages of the improved creeper being a headrest which is readily adjustable into any one of a number of positions, bringing the head of the mechanic up close to the work thereby avoiding working directly under the hands where the dirt and grease are likely to fall into the eyes.

Another object of the invention resides in so shaping the side arms of the headrest that they will not bear against the shoulders of the mechanic when the headrest is raised.

Other objects and advantages appear in the following specification, reference being had to the accompanying drawing, in which—

Figure 1 is a perspective view of the improved creeper.

Figure 2 is a central longitudinal section illustrating how the headrest can be adjusted by the mechanic while reclining.

Figure 3 is a detail sectional view taken substantially on the line 3—3 of Figure 1.

Figure 4 is a detail inverted plan view of the creeper illustrating the channel construction of one of the cross bars.

Figure 5 is a cross section on the line 5—5 of Figure 1.

As already briefly stated above, the purpose of the invention is to provide a low car upon which a mechanic can recline and freely move about upon the garage floor beneath a motor vehicle. Such device is commonly known as a creeper. The improved creeper is composed of a platform 1 which is made up of a plurality of slats 2 and 3 of which the former are shorter than the latter, the particular arrangement being as shown in Figures 1 and 4.

The slats are secured in slightly spaced relationship upon cross bars 4 and 5 by means of rivets or other suitable fastening means 6, those rivets that pass through the outer slats 2 serving the additional function of securing the bases 7 of the corner casters 8. The casters are preferably ball bearing so that they may revolve freely in all directions and facilitate the desired movement of the mechanic while the creeper is in use.

Each cross bar is composed of ordinary band or sheet iron of sufficiently heavy gauge, the edges being turned down at 9 on all sides (Figs. 3 and 4) to produce a channel construction. The cross bars are additionally strengthened by producing longitudinal ribs 10 (Fig. 3) in the course of manufacture. The cross bars may be made of pressed steel, or any other material suitable for the purpose. The cross bars have a slight longitudinal curvature (Fig. 5) thereby disposing the series of slats 3 on a slight concavity, thereby to more readily retain the body of the mechanic.

The ends of each cross bar are turned out straight (Fig. 5) and the side slats 2 are secured upon these straight ends. These straight ends are necessary to provide true rests for the bases 7 of the casters because it would hardly do to have any other but level places at which to secure the caster bases. It is to be observed in Figure 4 that the caster bases fit in the spaces between the side flanges 9, thereby holding the casters firmly so that they cannot rock about even though the fastening means 6 should become slightly loose.

It is an important consideration to make the headrest 11 adjustable into any one of a number of positions. The side arms 12 of the headrest are curved or bent at 13 (Figs. 1 and 2) thereby making room for the shoulders of a mechanic and preventing interference therewith when the headrest is raised. The upper extremities of the side arms are secured at 14 to the block 15 of the head rest.

The lower extremities of the side arms have holes 16 (Fig. 3) which receive those portions of the flanges 9 adjacent to openings 17 (Figs. 3 and 4) in the cross bars 5. The sides of the arms 12 are split at 18 (Fig. 3) whereupon the extremity is bent to permit fitting around the flange 9 at the opening 17. The end is finally bent back to close the hole 16 and complete the hinge joint.

A substantially U-shaped brace 19 provides the support of the headrest 11. The sides of the brace pass through the spaces between certain ones of the slats 3. The connecting bridge 20 passes through a keeper 21 which is secured underneath the central slat. The keeper has a plurality of recesses 22 in which the bridge 20 is held by downward pressure in the direction of the arrow $a$ (Fig. 2) by the head of the mechanic. The outwardly turned upper extremities of the brace 19 are fitted in screw eyes 23 which provide pivotal mountings.

The operation may be readily understood. Upon desiring to do work underneath of a motor car or other vehicle the mechanic lays down upon the creeper and upon appropriate manipulation propels himself along the floor until he reaches the desired location. Any one who has had such work to do knows that it is extremely tiring to the neck muscles to have to support the head without any rest. Even a permanent rest will not afford the desired relief.

Upon working overhead, as a mechanic does when lying upon the creeper, it becomes the natural tendency to bring the face almost directly under the hands, thereby making it likely to receive dirt, grease, etc., in the eyes and face. But by being able to raise his head, the mechanic finds himself in position to bring his head up close to the work so that he can both see better and obviate possibility of filling his face with dirt.

These considerations make the adjustable head rest most desirable, but in providing an adjustable headrest the necessity of making adjustments quickly and easily was borne in mind. A mechanic when reclining under an automobile assumes a most uncomfortable and cramped position. As suggested in Figure 2 the mechanic has only to reach backward with one or both hands and accompany a slight yielding movement of the head by a pulling motion upon the brace 19 in the direction of the arrow $b$. This dislodges the bridge 20 from the recess 22, and upon relaxing the neck the mechanic can let the headrest down until any one of the remaining adjustments is reached.

Mention has been made before of the central series of slats 3 being longer than the side slats 2. The extension of the slats 3 provides a firm base for the headrest 11 when permitted to fall down into contact therewith in the lowermost adjustment. The central slat of the extension provides a mounting for the keeper 21, as already stated. The extremities of the central slats are bound together by a strip of iron 24, rivets or other suitable fastening means being employed to secure the individual slats.

While the construction and arrangement of the improved creeper as herein described and claimed is that of a generally preferred form, obviously modifications and changes may be made without departing from the spirit of the invention or the scope of the claims.

I claim:—

1. A creeper including a headrest, side arms each having a hole in the free extremity, the adjacent portion of the side arm being cut into the hole, and a cross bar having a flange and adjacent openings through which the extremities of the side arms can be inserted by bending them out at said cuts and then by bending them back to close the holes at said cuts, thereby providing pivotal mountings.

2. A creeper comprising spaced slats, cross bars connecting the slats, casters mounted upon the cross bars, a head rest, inclined side arms carrying the head rest extending through the spaces between certain slats and having pivotal connection with one of the cross bars, a keeper affixed to the under side of one of the slats and having a plurality of recesses directed rearwardly, and a head rest brace inclined in the direction of the side arms, extending through other slat spaces and including a bridge to engage any one of the recesses by entering from the rear, said inclination of the brace permitting disengagement of the bridge by manual rotation of the brace toward the side arms accompanied by a raising motion of the head rest preparatory to making a new adjustment in said recesses.

FRANK RAY NEAL.